United States Patent [19]
Bachmann

[11] Patent Number: 4,965,416
[45] Date of Patent: Oct. 23, 1990

[54] ACCELERATION AND DECELERATION SENSOR

[75] Inventor: Rolf Bachmann, Nuremberg, Fed. Rep. of Germany

[73] Assignee: W. Günther GmbH, Nuremberg, Fed. Rep. of Germany

[21] Appl. No.: 350,677

[22] Filed: May 11, 1989

[30] Foreign Application Priority Data

May 11, 1988 [DE] Fed. Rep. of Germany ... 8806240[U]

[51] Int. Cl.$^5$ .................. H01H 35/14; H01H 9/00
[52] U.S. Cl. .......................... 200/61.45 M; 335/205
[58] Field of Search ............... 200/61.45 R, 61.45 M; 335/205–207, 202

[56] References Cited

U.S. PATENT DOCUMENTS

| | | | |
|---|---|---|---|
| 3,673,527 | 6/1972 | Wolf | 335/207 |
| 3,932,718 | 1/1976 | Porat | 200/61.93 |
| 4,409,577 | 10/1983 | Holce et al. | 335/205 X |
| 4,518,835 | 5/1985 | Grossar | 200/61.45 M |
| 4,639,563 | 1/1987 | Gunther | 200/61.45 M |
| 4,739,135 | 4/1988 | Custer | 335/205 X |

FOREIGN PATENT DOCUMENTS 3216321 9/1983 Fed. Rep. of Germany .

Primary Examiner—J. R. Scott
Attorney, Agent, or Firm—Spencer & Frank

[57] ABSTRACT

An acceleration and deceleration sensor includes a housing; first and second elongate cavities formed in the housing and extending parallel to one another; a reed switch disposed in the first cavity; a first elongate permanent magnet immovably secured in the second cavity; and a second elongate permanent magnet longitudinally slidably received in the second cavity and arranged end-to-end relative to the first magnet. The reed switch and the second magnet are arranged with respect to one another such that upon movement of the second magnet the magnetic field thereof actuates the reed switch. The sensor further has a lid cooperating with the first cavity and has a closed and an open position. In the closed position the lid covers the first cavity and is supported on the housing and in the open position the first cavity is exposed to environment external to the housing. The lid is arranged for movement from the closed position to the open position in a direction transverse to the length dimension of the elongate first cavity. There is further provided an adjustment screw closing an end of the second cavity.

12 Claims, 2 Drawing Sheets

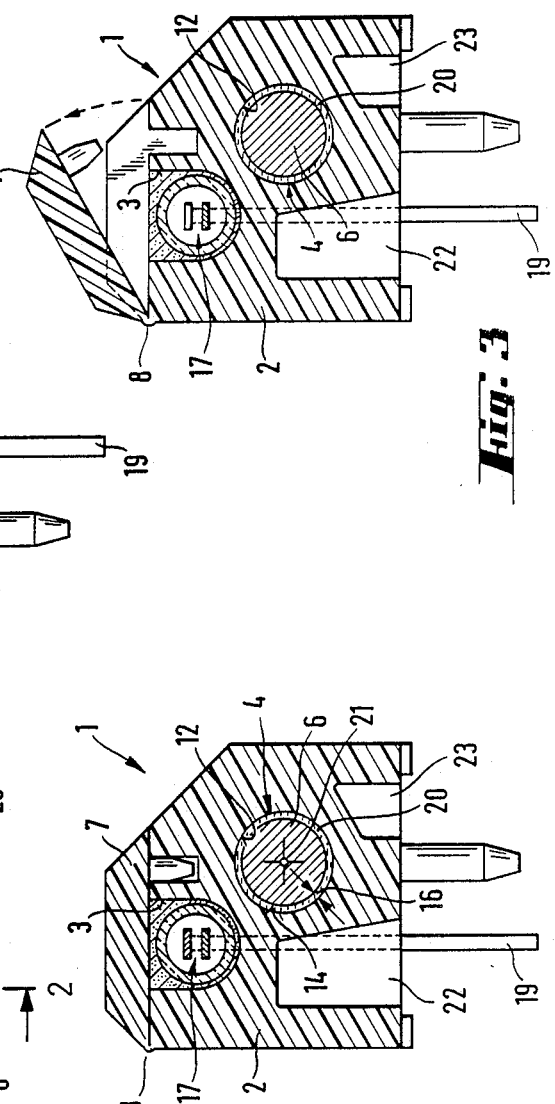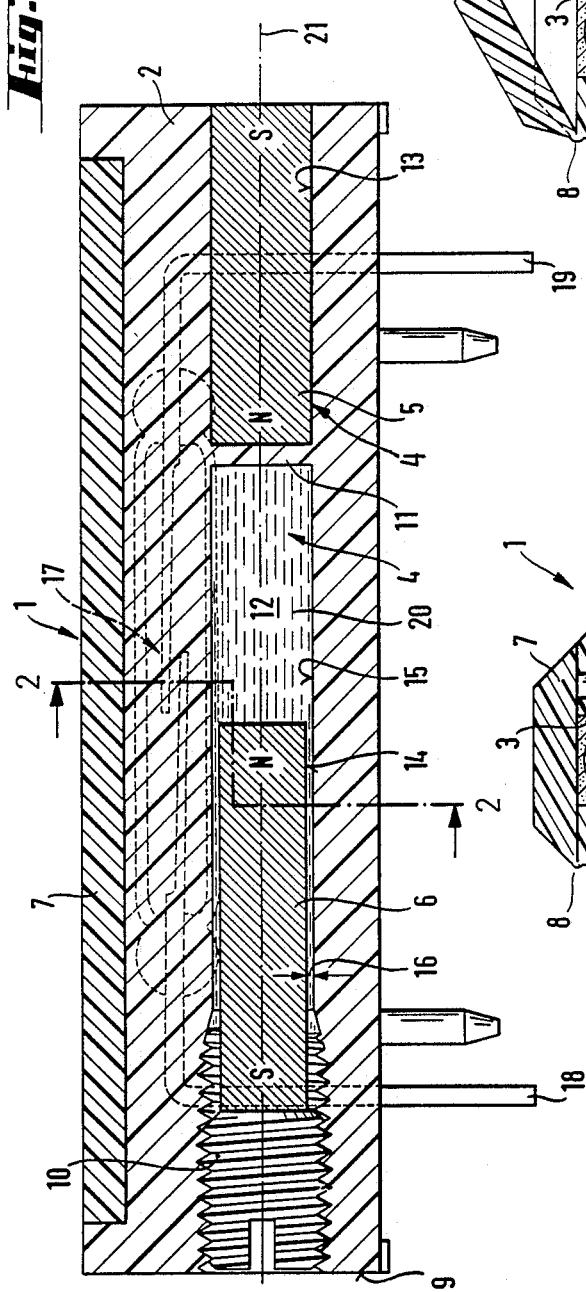

ACCELERATION AND DECELERATION SENSOR

CROSS REFERENCE TO RELATED APPLICATION

This application claims the priority of Federal Republic of Germany Application No. G 88 06 240.6 filed May 11th, 1988, which is incorporated herein by reference.

BACKGROUND OF THE INVENTION

The invention relates to an acceleration or deceleration sensor comprising a housing which includes a plurality of mutually parallel tunnel-shaped cavities. A reed switch is disposed in at least one of the cavities and two rod-shaped permanent magnets are disposed end-to-end in at least one other cavity. The arrangement of the permanent magnets is such that two identical poles thereof face one another and at least one of the permanent magnets is displaceable in the longitudinal direction. The reed switch or switches are arranged in such a way that they are actuated by the magnetic field of the displaceable permanent magnet upon its displacement.

Sensors of the above-outlined type which, however, have but a single reed switch and a single tunnel-shaped cavity with a movable permanent magnet disposed therein are disclosed, for example, in German Patent No. 3,338,287, to which corresponds U.S. Pat. No. 4,639,563. They are employed, among others, in safety devices for automobiles. Such safety devices may comprise, for example, a bag that can be inflated by compressed air or other gas and is disposed in the region of the steering wheel. In case of a head-on collision, the bag is suddenly inflated and thus prevents the driver from hitting the steering wheel. The compressed air required to inflate the bag is on board in a compressed air bottle which is normally sealed by means of a magnetic valve. In case of a head-on collision, the magnetic valve opens and the path is released for the compressed air so that it is able to flow from the supply bottle into the air bag. The magnetic valve may be actuated (opened) by an acceleration and deceleration sensor to which the invention is directed. For this purpose, the sensor may directly switch a triggering system, such as a thyristor, or another appropriate electronic triggering circuit.

The acceleration and deceleration switch may find uses in other environments, such as centrifuges and the like.

Sensors of the described type are required in large quantities. It is desirable that the sensors themselves take up as little space as possible and that their response behavior fluctuate within narrow limits. It is furthermore expected that the response range, that is, the acceleration or deceleration at which the reed switch is closed can be set to meet the respective requirements and that the set value is adhered to as accurately as possible. These requirements are difficult to meet with the conventional structures. This drawback may be overcome, for example, by producing and testing a larger number of sensors, and selecting them according to the measuring results.

SUMMARY OF THE INVENTION

It is an object of the invention to provide an improved acceleration and deceleration sensor which is more accurate and is more economical to manufacture and wherein the set response values are more uniform.

This object and others to become apparent as the specification progresses, are accomplished by the invention, according to which, briefly stated, the acceleration and deceleration sensor has a housing including a plurality of mutually parallel tunnel-shaped cavities. A reed switch is accommodated in one cavity and two rod-shaped permanent magnets are arranged in another cavity. The cavity for accommodating the reed switch has a cover which can be removed transversely to the longitudinal axis of the cavity; and the cavity for accommodating the displaceable permanent magnet is closed, at its outwardly oriented end face, by means of an adjustment screw.

The proposed features result in the following advantages:

The cover, which normally deals the cavity containing the reed switch (or switches), permits an easy insertion of the reed switch from the outside during assembly of the sensor. The position of the reed switch can be adjusted within narrow limits and the housing, due to its novel structure, can be processed in automatic assembly machines. After insertion of the reed switch, the cover is placed onto the housing, thus fixing the reed switch immovably in its position. The adjustment screw permits shifting the displaceable permanent magnet into its optimum starting position, thus accurately setting its position relative to the reed switch. Once the movable magnet has been brought into its optimum starting position, the adjustment screw is arrested, for example by means of hard wax, lacquer, a resin or the like.

The proposed acceleration and deceleration sensor may, in principle, be of such a configuration that only one reed switch and one movable rod magnet are provided in mutually parallel tunnel-shaped cavities. This normal configuration is sufficient, in principle, to permit the necessary switching process to take place. However, in some cases it is desirable, for example for reasons of redundancy, to switch several mutually independent reed switches simultaneously. For the same reasons, it may also be desirable to have available a plurality of movable permanent magnets. In these cases, the housing may be manufactured to accommodate two or more such units, preferably in such a manner that several reed switches are actuatable by a single permanent magnet. It is also possible, in order to increase reliability, to accommodate several permanent magnets in different cavities and cause the magnets to act on one and the same reed switch or on the same group of reed switches According to a further advantageous feature of the invention, the cover disposed above the reed switch is of the "flip-open" type and is connected with the housing by means of one or several film hinges (also termed as "living" hinges). In this way, the entire housing together with the hinged cover can be manufactured as a single, injection-molded unit, thus reducing costs as well as the tolerance limits for dimensional deviations. Suitable materials for the manufacture of such housings are tough and preferably impact-resistant organic polymers, for example polyamides, particularly glass fiber reinforced polyamides.

According to a further feature of the invention, the cavity for accommodating the permanent magnets is subdivided by means of a constriction into two serially arranged subchambers, each accommodating one of the two permanent magnets. By virtue of such a constriction, which can easily be drain during the production of the housing in an injection molding process, the fixed permanent magnet, which acts as a braking magnet, can easily be placed at its intended location in a well-defined, unchanging position. The movable permanent magnet is placed into the other, usually larger subchamber in which it is able to move unimpededly.

According to another particularly advantageous feature of the invention, the cavity accommodating the permanent magnets is divided into subchambers by a partition. In such a case it is possible to fill the subchamber for the movable permanent magnet with a damping fluid, thus making available an additional medium for influencing the dynamic behavior of the movable magnet and thus the switching behavior of the entire sensor. To utilize the effect of the damping fluid, a gap is provided for allowing passage of the damping fluid between the exterior face of the displaceable permanent magnet and the interior face of the subchamber accommodating it. If a deceleration or an acceleration of sufficient magnitude acts on the sensor, the movable permanent magnet is displaced as a result of its inertia. Depending on the width of the gap and on the viscosity of the damping fluid, the permanent magnet then moves with certain velocities parallel to the longitudinal axis of its associated subchamber. The movement of the permanent magnet results in a displacement of its magnetic field which thus actuates the reed switch.

To more precisely set the damping effect, it is further proposed to smooth or polish the surface of the permanent magnet. The degree of smoothing or polishing can also be included in the calculations to set the damping effect to the desired value.

BRIEF DESCRIPTION OF THE DRAWING

FIG. 1 is a schematic sectional side elevational view of a preferred embodiment of the invention.

FIG. 2 is a sectional view taken along line II—II of FIG. 1.

FIG. 3 is a view similar to FIG. 2, showing a cover component partially open.

DESCRIPTION OF THE PREFERRED EMBODIMENTS

Figure 4:
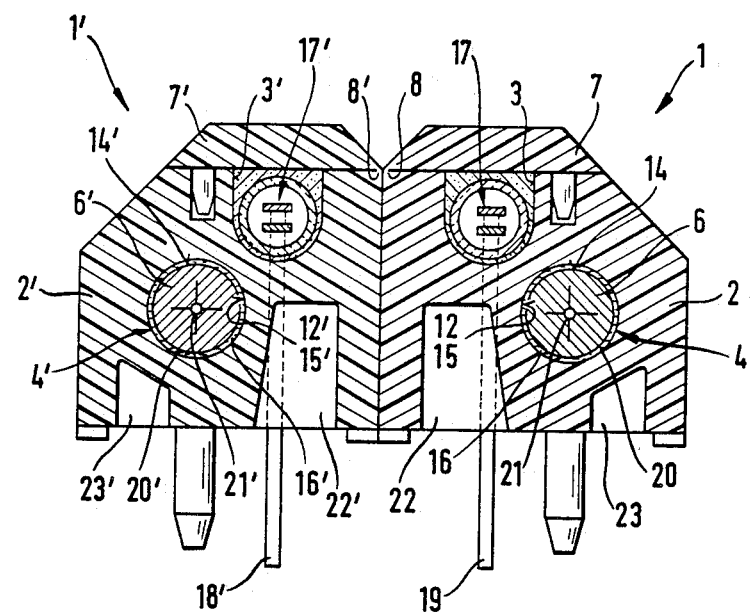
FIG. 4 is a sectional end elevational view of another preferred embodiment of the invention.

The acceleration and deceleration sensor shown in FIGS. 1, 2 and 3 generally designated at 1 is composed of a housing 2 which includes two mutually parallel elongate cavities 3 and 4. The housing 2 further has, in its bottom, two parallel recesses 22 and 23.

In the assembled state, a reed switch 17 having terminal leads 18, 19 is disposed in the cavity 3 and two elongate (rod-shaped) permanent magnets 5 and 6 are disposed in the cavity 4. The permanent magnet 5 is immovable, while the permanent magnet 6 is displaceable. The permanent magnets are arranged in such a manner that two identical poles (for example, the N poles) face one another. The entire arrangement is such that, upon displacement of the permanent magnet 6, its magnetic field actuates the reed switch 17.

According to the invention, a cover or lid 7 is mounted on the housing 2 and serves as a closure for the cavity 3. The cover 7 is openable and closable transversely to the longitudinal axis of the cavity 3. In the preferred embodiment shown in the drawing, the cover 7 is a hinged cover which is undetachably connected with the housing 2 by way of a film hinge 8. Depending on the size of the housing and of the cover, respectively, and depending on the material employed, it may be of advantage to provide either a single film hinge 8 which extends over the entire length of the cover or several smaller film hinges arranged in series.

The cavity 4 is completely subdivided by a partition 11 into end-to-end arranged subchambers 12 and 13. The subchamber 12 longitudinally displaceably receives the permanent magnet 6 and is closed at the end remote from the partition 11, by an adjustment screw 10 threadedly received in the housing 2 at its end face 9. By turning the adjustment screw 10, the starting end position of the movable permanent magnet 6 may be varied. The subchamber 13 of the cavity 4 immovably accommodates the permanent magnet 5. The partitioning of the cavity 4 into the two subchambers 12 and 13 has various advantages: it permits dimensioning of the chamber 13 such as to accurately correspond to the dimensions of the permanent magnet 5. Thus, the permanent magnet 5 is fixed in a determined position which is of great significance for the accuracy of the response values. The partitioning further permits the subchamber 12 to be filled with a damping fluid 20, thus providing a further possibility of influencing the motion behavior of the movable permanent magnet 6 and thus the switching characteristics of the sensor. In order to provide a required gap or passage 16 between the outer lateral surface 14 of the magnet 6 and the inner wall face 15 of the subchamber 12 for allowing passage of the damping fluid as the magnet 6 is displaced, either the magnet 6 is of a lesser diameter than the magnet 5, or the diameter of the subchamber 12 is larger than that of the subchamber 13. If, upon the occurrence of an acceleration or deceleration moment, the permanent magnet 6 moves in the direction of the longitudinal axis 21 of the subchamber 12, damping fluid flows through gap 16, which is possible only at a relatively slow rate, so that the permanent magnet 6 is braked. The slower the movement of the permanent magnet 6, the greater the response delay of the sensor.

Silicone oils are primarily applicable as damping fluid 20 which may be selected according to the desired viscosity. Silicone oils have the advantage over other fluids, for example paraffins, in that they have a relatively low temperature coefficient for their viscosity so that sensors filled with silicone oil can be used at temperatures from about $-40°$ C. to $+160°$ C.

The magnetic materials for the permanent magnets 5, 6 must also be selected with a view toward the temperature range in which the sensors are to be employed. The significant factor is that the magnetic materials have a relatively low temperature coefficient for their coercive force; the magnitude of the coercive force itself is less significant since the reed switches to be employed are capable of reacting to a relatively weak magnetic field. In view of these conditions, AlNiCo magnets have been found most satisfactory in tests performed for this purpose.

FIG. 4 shows two acceleration and deceleration sensors 1 and 1' in a back-to-back, parallel arrangement. The sensor 1' is a structural duplicate of sensor 1; components that correspond to those of sensor 1 have the same reference numeral, provided with a prime (') sign. This dual sensor configuration permits opening of the covers 7, 7' independently from one another about respective hinges 8, 8' and thus access can be gained to the reed switches 17, 17' and to the reed switch chambers 3 and 3'.

It will be understood that the above description of the present invention is susceptible to various modifications, changes and adaptations, and the same are intended to be comprehended within the meaning and range of equivalents of the appended claims.

What is claimed is:

1. In an acceleration and deceleration sensor including a housing; first and second elongate cavities formed in said housing and extending parallel to one another; a reed switch disposed in said first cavity; a first elongate permanent magnet immovably secured in said second cavity; a second elongate permanent magnet longitudinally slidably received in said second cavity and arranged end-to-end relative to the first magnet; said reed switch and the second magnet being arranged with respect to one another such that upon movement of said second magnet the magnetic field thereof actuates said reed switch; the improvement comprising
   (a) a lid cooperating with said first cavity and having a closed and an open position; in said closed position said lid covering said first cavity and being supported by said housing; in said open position said first cavity being exposed to environment external to the housing; said lid being arranged for movement from the closed position to the open position in a direction transverse to the length dimension of said elongate first cavity; and
   (b) an adjustment screw closing an end of said second cavity; said second magnet being situated between said end and said first magnet.

2. An acceleration and deceleration sensor as defined in claim 1, wherein said first and second magnets each have opposite ends; and further wherein the end of the first magnet and the end of the second magnet oriented toward one another have the same polarity.

3. An acceleration and deceleration sensor as defined in claim 1, wherein said second magnet has a polished surface.

4. An acceleration and deceleration sensor as defined in claim 1, wherein there are provided a plurality of first cavities in said housing and a plurality of reed switches; each said first cavity accommodating one of said reed switches.

5. An acceleration and deceleration sensor as defined in claim 1, wherein there are provided a plurality of second cavities in said housing, a plurality of first magnets and a plurality of second magnets; each said second cavity accommodating one of said first magnets and one of said second magnets.

6. An acceleration and deceleration sensor as defined in claim 1, further comprising a hinge swingably securing said lid to said housing.

7. An acceleration and deceleration sensor as defined in claim 6, wherein said hinge is a film hinge.

8. An acceleration and deceleration sensor as defined in claim 7, wherein said housing, said film hinge and said lid form a one-piece component.

9. An acceleration and deceleration sensor as defined in claim 1, further comprising dividing means for subdividing said second cavity into a first subchamber accommodating said first magnet and a second subchamber accommodating said second magnet.

10. An acceleration and deceleration sensor as defined in claim 9, wherein said dividing means is a partition fully separating said first and second subchambers from one another.

11. An acceleration and deceleration sensor as defined in claim 10, further comprising a damping fluid contained in said second subchamber and means defining a passage along said second magnet for allowing displacement of said fluid during longitudinal motion of said second magnet.

12. An acceleration and deceleration sensor as defined in claim 11, wherein said second magnet has an outer lateral surface and said second subchamber is bounded by an inner wall of said housing; said passage being defined between said outer lateral surface and said inner wall.

* * * * *